May 2, 1933.    M. B. BENSON    1,907,235
MOVING SIGN
Filed May 18, 1929
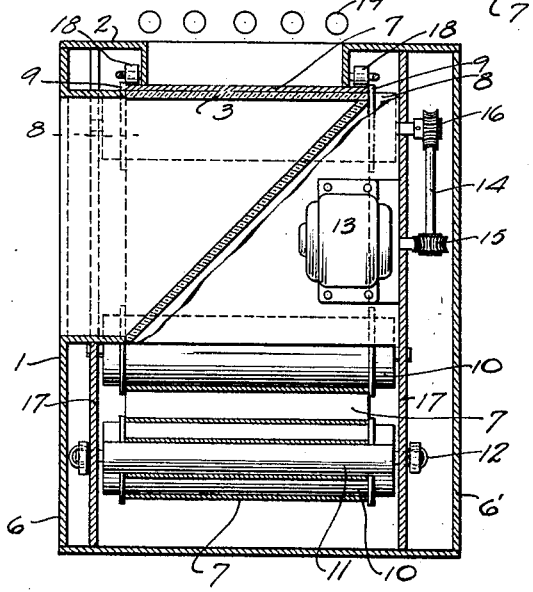
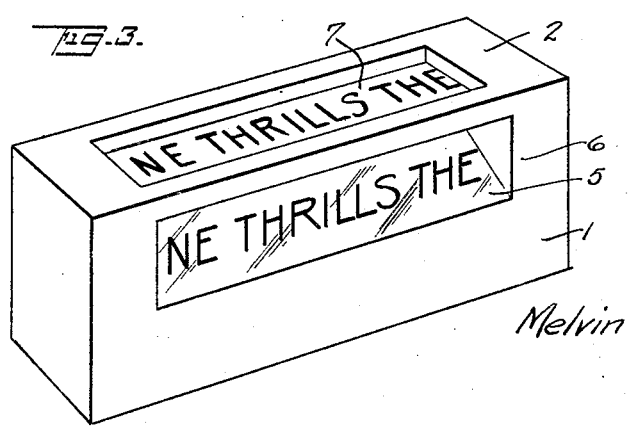
INVENTOR
Melvin Bernard Benson
BY
ATTORNEY Patented May 2, 1933

1,907,235

UNITED STATES PATENT OFFICE

MELVIN BERNARD BENSON, OF NEW YORK, N. Y., ASSIGNOR, BY MESNE ASSIGNMENTS, TO MELVIN B. BENSON CORPORATION, A CORPORATION OF NEW YORK, AND MELVIN B. BENSON, OF JACKSON HEIGHTS, NEW YORK

MOVING SIGN

Application filed May 18, 1929. Serial No. 364,054.

This invention relates to moving signs.

The object of the invention is a moving sign operable either by daylight or artificial illumination and which is characterized by its simplicity in construction, its reliability in operation and its economy in manufacture, installation, maintenance and operation.

For a better understanding of the invention reference may be had to the accompanying drawing forming a part of this application wherein:

Fig. 1 is a side view of the sign with the side cover plate removed,

Fig. 2 is an end sectional view along the line 2—2 of Fig. 1, and

Fig. 3 is a perspective view of the unit without artificial illumination.

Referring to the drawing my novel sign includes a rectangular casing or housing 1, the top 2 of which is provided with a rectangular opening corresponding in dimensions to a colored glass window 3. A mirror 4 is disposed below the window 3 at the desired angle, as indicated in the drawing, to project the advertisement through the window 5 of the front cover plate 6 of the housing, the forward projection of the mirror 4 corresponding in dimensions to the window 5. A continuous belt 7 of rubberized cloth or other suitable material which is stencilled with the desired advertisement to be projected is run over the colored glass window 3, preferably in contact therewith. It is guided over the window by means of a pair of guide pulleys 8, these pulleys preferably having flanges 9 to cause the belt to pursue a straight and even course thereover with no substantial lateral displacement. In order to provide for the elongated character of the belting required additional fixed pulleys 10 and tension pulleys 11 are provided below the level of the guide pulleys 8. The tension pulleys 11 are provided with suitable spring or yielding mechanisms 12 for putting the desired tension on the belting and taking up slack. Preferably the stencilled belting is driven by an electric motor 13, the latter being geared down to one of the rollers 8 by means of an intermediate counter shaft 14 with suitable worm gearings 15 and 16 interposed between the shaft 14 and the motor 13 and the guide pulley 8 respectively. The guide pulleys, the motor 13 and the gearing may be supported in any suitable manner as, for example, by means of a frame 17, the latter also preferably carrying the colored glass window 3 and the mirror 4 with co-operating mechanism. The whole is readily insertable into the housing 1 as a unit as, for example, through the back or the front of the housing depending upon which of the walls 6 or 6' is removable for this purpose. In the operation of the unit ordinarily the weight of the belting 3 is sufficient to cause the same to be guided evenly along and over the colored glass window, but if necessary suitable pressure rollers or guide devices 18 may be disposed thereabove and supported from any suitable part of the frame for pressing the belt into firm contact with the glass window.

I have indicated at 19 means for furnishing artificial illumination for the window 3, such, for example, as and preferably neon tubes. The mechanism may, therefore, either utilize the light from these tubes or may utilize ordinary daylight, the tubes 19 not interfering with the passage of daylight rays through the window. The tubes 19 are diagrammatically indicated and the electrical connections are omitted for convenience in illustration. These electrical connections as well as the electrical control therefor and for the motor 3 may be of any standard or usual form.

In the operation of the mechanism the tubes 19 may be connected for operation at night or may be disconnected in daylight, the daylight ordinarily being sufficient to project the advertisement forwardly through the intermediary of the mirror 4. The mechanism, as indicated, is of very simple construction, has a maximum of reliability in operation and may be economically maintained. Moreover, the belting 7 which moves in contact with the window 3 serves to keep the latter cleared of dust and other foreign matter, and the window serves as an even surfaced guideway for the belt. With illumination furnished by the neon tubes of the desired colors, the projected letters assume a bar-like form corresponding to the tubes and a novel effect is thereby produced.

While I have described the window 3 as colored, it may be plain white glass, and preferably would be plain uncolored glass when neon tubes of the desired color are used. The window 3 is therefore preferably readily removable and interchangeable. This interchange may be readily effected by lifting it from its seat or supports when the mechanism unit is outside the casing, or the window 3 may be slid out through the rear of the casing when the rear wall 6' is removable, an opening for this purpose being provided in the rear frame member 17.

The tubes 19 may be yieldingly supported by means of the collars 20 around the ends thereof and spring supports 21.

It is understood, of course, that while I have shown the window 3 as being horizontally disposed it may be disposed in any other suitable position as, for example, in the rear of the casing in a vertical plane with a suitable mirror system for forwardly projecting the advertisements determined by the moving stencilled belt.

I claim:

In a moving sign unit, a casing, a glass window for the reception of light, an optical projecting means functioning therewith to project the light from the casing, a continuous stencilled travelling belt travelling adjacent the window and permitting the transmission of light only through the stencils, a multiplicity of guide rollers for the continuous belt and an electric motor geared down to said guide rollers, the optical projecting means, the belt and the guide rollers being carried as a unit which is readily insertable as a whole into the casing.

In testimony whereof, I have signed my name to this specification.

MELVIN BERNARD BENSON.